W. KUEHN.
Wheel-Plow.
No. 40,629. Patented Nov. 17, 1863.
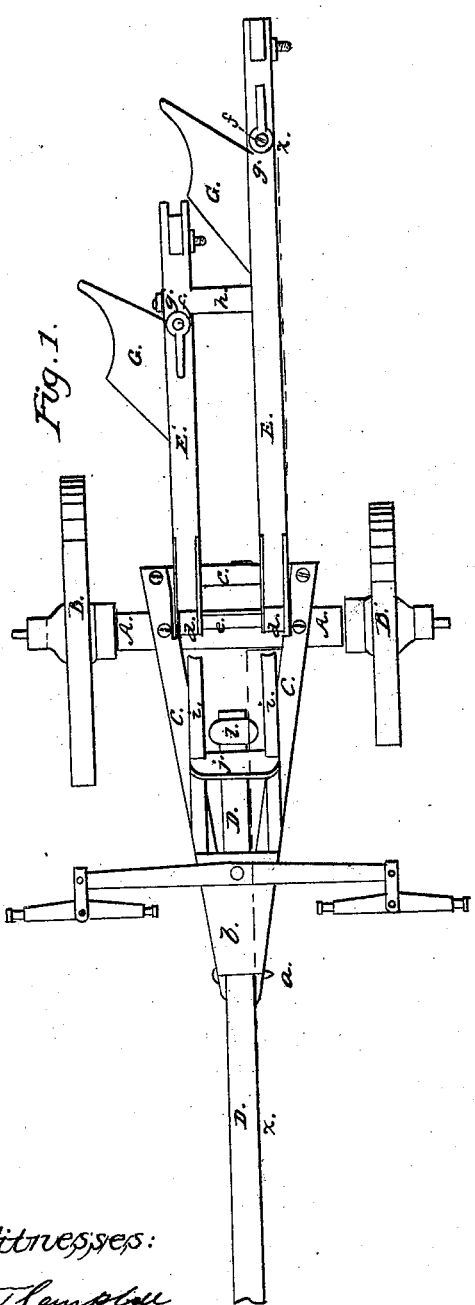
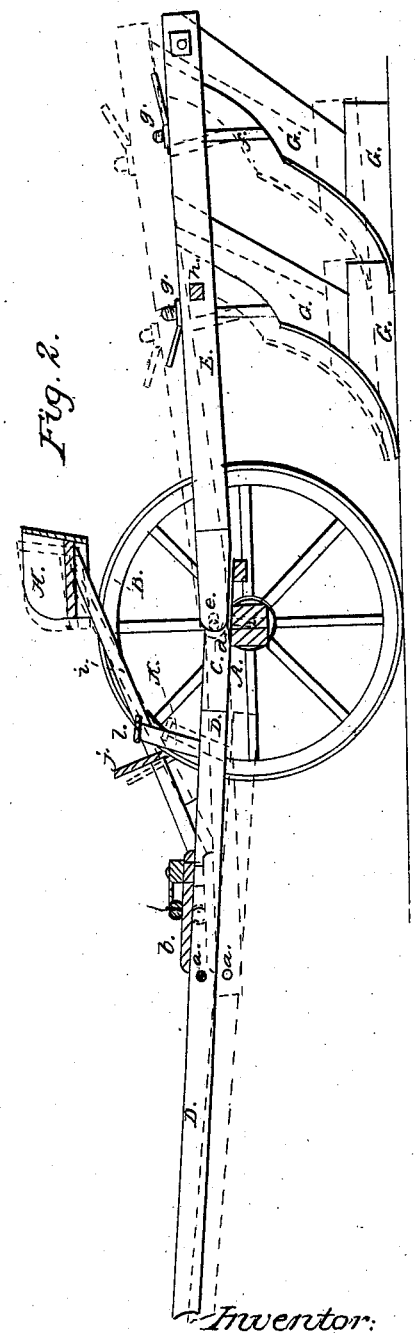

UNITED STATES PATENT OFFICE.

WILLIAM KUEHN, OF LIVELY, ILLINOIS.

IMPROVEMENT IN GANG-PLOWS.

Specification forming part of Letters Patent No. 40,629, dated November 17, 1863.

*To all whom it may concern:*

Be it known that I, WILLIAM KUEHN, of Lively, in the county of St. Clair and State of Illinois, have invented a new and Improved Gang-Plow; and I do hereby declare that the following is a full, clear, and exact description thereof, reference being had to the accompanying drawings, making a part of this specification, in which—

Figure 1 is a top view of my improved machine. Fig. 2 is a vertical longitudinal section through Fig. 1, taken in the course of the red line $x\ x$ thereon.

Similar letters of reference indicate corresponding parts in the several figures.

This invention relates to an improvement in that class of plows which are connected together in gangs and have their beams attached to a carriage upon which the driver is mounted to control the team and to operate the plows.

The object of my invention is to construct a gang-plow of the above description in such a manner that the plows, or the carriage to which they are attached, can rise and fall independently of each other, and thus accommodate themselves to the surface of uneven land, at the same time providing means for enabling the driver to raise the plows entirely from the ground to escape stumps and other obstructions, or to move the machine from one place to another without bringing the plows into operation, as will be hereinafter described.

To enable others skilled in the art to understand my invention, I will describe its construction and operation.

In the accompanying drawings, A represents the axle-tree of two carriage-wheels, B B′, one of which is smaller than the other, and this one runs on the surface of the unplowed ground while the other runs in the furrow.

C C′ are the hounds, which support the draft-pole D in front of the axle A and the plow-beams E E in rear of this axle. These hounds are securely bolted to the top of the axle A and project out from it on each side some distance. The converging or forward ends of the hounds are extended quite a distance from the axle, and between these ends the draft-pole is pivoted by a horizontal transverse bolt, $a$, which is the fulcrum for the pole D. The rear end of pole D is projected behind this pivot-connection and covered by a stop-plate, $b$, which is bolted to the upper surface of the hounds and prevents them from rising higher than is shown in black lines, Fig. 2. Below the rear ends of the hounds and extending transversely across them is a bar, $c$, which is secured to the hounds and serves as a lower support for the longitudinal plow-beams E E′, and prevents the rear ends of these beams from descending too far, or so far as would run the plows out of the ground.

The plow-beams E E′ are pivoted to metal blocks $d\ d$, which are bolted to the axle-tree by means of a transverse rod, $e$, which passes through plates on the ends of the beams and through eyes in the blocks $d\ d$, as shown clearly in the drawings. Thus it will be seen that the rear ends of the beams E E′ are allowed to rise and fall, and that they are checked in their downward motion by the cross-bar $c$.

The plows G G may be made of any desirable form, and they are arranged one in front of the other for turning two slices at one operation. Their standards G′ G′ are pivoted to their respective beams E E′ and braced by means of rods $f f$, which pass up through the beams E E′ and receive on their ends nuts $g\ g$, by means of which the points of the plows can be set to run at a greater or less depth in the ground, as occasion may require. The transverse bar $h$ connects the beams E E′ together parallel to each other, and they both rise and fall together in passing over hilly land.

The driver's seat H is mounted on inclined supports $i\ i$, and may be furnished with a dash-board or foot-rest, $j$. The supports $i\ i$ incline forward and extend backward such a distance as to bring the weight of the driver over the axle-tree A, and to enable him to exert his weight to the best advantage in raising the plows while sitting in this seat.

A standard, $k$, is secured to and projects up from the rear end of the pole D, and on top of this standard is a foot-board, $l$, which is directly behind the dash-board $j$ and in a convenient position to the driver's feet.

In practice it will be necessary to extend the rear ends of the hounds C C farther back than is represented in the drawings, and also to lengthen the leverage in front in order to enable the driver to raise the plows above the ground by pressing upon the rear end of the pole D. The plows themselves will in practice be made much smaller in proportion than those represented in the drawings. These practical changes are, however, obvious to the mechanic, and they do not in any respect change the principle of my invention, which consists in pivoting the front ends of the plow-beams to the top of the axle A and supporting the beams thus pivoted by means of a transverse bar, $c$, which is bolted to the rear extended ends of the hounds, said hounds, together with the draft-pole, constituting a compound leverage for enabling the driver to raise the plows over obstructions.

It is not intended that the driver shall have leverage sufficient to raise the plows out of the ground, although this may even be done in some instances. When the machine is in operation and the plows turning the slices over, and it becomes necessary to raise the plows, the driver will back the machine a few inches and then raise the plows over the obstruction.

It will be seen from the above description that the rear ends of the plow-beams, together with the plows, are allowed to rise and fall freely without affecting the position of the hounds or the draft-pole or the driver's seat. The plows will therefore accommodate themselves to land having an uneven surface, and they will run at a uniform depth from one end of the field to the other, controlled by the rake or pitch which is given to them by the adjusting-bars $ff$, as above described. When the machine arrives at the terminus of one furrow the driver again backs the horses sufficiently to allow the plows to be raised. He then presses upon the foot-piece $l$ and raises the plows free from the ground, which enables him to turn the machine and to start off again. The plow-beams being pivoted directly to the axle-tree, and the driver's seat being mounted on the hounds, it will be seen that the driver is not subjected to the jolting and unpleasant jarring which result from connecting the seat to the plow-beams, as hitherto. The plows are freer to rise and fall, and the driver will have a better control over his team, as well as over the plows.

Having thus described my invention, what I claim as new, and desire to secure by Letters Patent, is—

1. Pivoting or hinging the front ends of the beams E E' to the top of the axle-tree A of two carriage-wheels in such manner that a lifting-bar, $c$, or its equivalent, may be applied beneath them to allow the beams to have an unrestrained swinging movement vertically, and to enable them to be operated by said bar, substantially as described.

2. A driver's seat arranged over the axle A and attached to the hounds C C, which are secured rigidly to said axle, in combination with swinging plow-beams E E', substantially as described.

3. The arrangement and combination of the pivoted plow-beams E E', pivoted draft-pole D, and extended hounds C C with the supporting-bar $c$, whereby the driver is enabled to raise the rear ends of the plow-beams by pressing upon the rear end of the draft-pole, the driver's seat being supported by and upon the hounds, substantially as described.

4. Applying the leverage power to the hinged beams E E', in rear of the axle A beneath said beams, by means substantially as described.

5. The combination of swinging plow-beams E E', hinged to the axle A, extended hounds C C, lifting-bar $c$, pivoted draft-pole D, transverse stop-plate $b$, and treadle $l k$, all arranged and operating substantially as described.

WILLIAM KUEHN.

Witnesses:
 LOUIS NURNBERGER,
 HEINRIH SCHMITT.